United States Patent [19]
Suzuki

[11] Patent Number: 5,627,677
[45] Date of Patent: May 6, 1997

[54] REAR CONVERSION LENS WITH VIBRATION-REDUCTION FUNCTION

[75] Inventor: Kenzaburo Suzuki, Tokyo, Japan

[73] Assignee: Nikon Corporation, Tokyo, Japan

[21] Appl. No.: 605,700

[22] Filed: Feb. 23, 1996

Related U.S. Application Data

[63] Continuation of Ser. No. 268,516, Jun. 30, 1994, abandoned.

[30] Foreign Application Priority Data

Jul. 12, 1993 [JP] Japan .................................... 5-195163

[51] Int. Cl.$^6$ ..................... G02B 27/64; G02B 15/14
[52] U.S. Cl. ........................ 359/557; 359/676; 359/684; 396/55
[58] Field of Search ........................... 359/554, 557, 359/676, 677, 683, 684, 766

[56] References Cited

U.S. PATENT DOCUMENTS

| | | | |
|---|---|---|---|
| 4,653,877 | 3/1987 | Hamanishi | 359/766 |
| 4,844,602 | 7/1989 | Kitagishi et al. | 359/557 |
| 4,907,868 | 3/1990 | Kitagishi et al. | 359/557 |
| 5,018,845 | 5/1991 | Yamazaki | 359/557 |
| 5,069,537 | 12/1991 | Kitagishi | 359/557 |
| 5,394,207 | 2/1995 | Fujisaki | 354/70 |

*Primary Examiner*—Thong Nguyen
*Attorney, Agent, or Firm*—Shapiro and Shapiro

[57] ABSTRACT

A rear conversion lens which has a negative refracting power and a function for magnifying, when mounted on an image side of an objective lens, an image formed by the objective lens, comprises, in the following order from an objective lens side, a first lens group having a positive refracting power and a second lens group having a negative refracting power. The lens groups are shifted as a whole in the direction perpendicular to the optical axis of the objective lens to stabilize the image magnified by the lens groups.

15 Claims, 3 Drawing Sheets

REAR CONVERSION LENS WITH VIBRATION-REDUCTION FUNCTION

This is a continuation of application Ser. No. 08/268,516 filed Jun. 30, 1994, now abandoned.

BACKGROUND OF THE INVENTION

1. Field of the Invention

The present invention relates to a rear conversion lens which is mounted on the image side of an objective lens to magnify an image formed by the objective lens and more particularly to a smaller rear conversion lens (teleconverter) capable of achieving image stabilization.

2. Related Background Art

In a single objective lens such as a photographic lens, as its focal length becomes larger, its shape becomes larger in accordance with the focal length and its manufacturing cost becomes high. Therefore, it is difficult to make a camera have a plurality of objective lenses having comparatively large different focal lengths.

A rear conversion lens is a comparatively small and inexpensive additional optical system to be mounted on the image side of an objective lens. As the rear conversion lens can easily magnify the focal length of the objective lens 1.6 times or the like, it is advantageous to utilize the rear conversion lens in terms of portability and cost.

However, in general, the rear conversion lens magnifies not only the focal length of the objective lens but also aberrations thereof, so aberration correction becomes very complicated. Also, as the focal length is magnified, the angle of view is narrowed, which easily causes deterioration of an image due to a shake of hands, vibration and so on.

In such a rear conversion lens, the above-mentioned aberration correction and image stabilization (a correction of a change of an image condition due to a shake of hands, vibration and so on) have not been performed sufficiently.

SUMMARY OF THE INVENTION

It is an object of the present invention to provide a smaller rear conversion lens capable of maintaining preferable image forming performance when mounted with respect to an objective lens and capable of performing image stabilization.

In order to achieve the above object, a rear conversion lens according to an embodiment of the present invention has a negative refracting power and a function for magnifying, when mounted on the image side of an objective lens, an image formed by the objective lens. The rear conversion lens comprises, in the following order from an objective lens side, a first lens group having a positive refractive power and a second lens group having a negative refracting power. The lens groups are integrally shifted in the direction perpendicular to the optical axis of the objective lens for stabilization of the image magnified by the lens groups. The rear conversion lens satisfies the following condition:

$|\Delta S/fR| < 0.1$ $1.1 < B < 1.8$

Here, fR is the focal length of the entire rear conversion lens, $\Delta S$ is the maximum shift amount of the lens groups to be shifted integrally in the direction perpendicular to the optical axis of the objective lens for stabilization of the image, and B is the magnification of the entire rear conversion lens.

In order to achieve the above object, a rear conversion lens according to another embodiment of the present invention has a negative refracting power and a function for magnifying, when mounted on the image side of an objective lens, an image formed by the objective lens. The rear conversion lens comprises, in the following order from an objective lens side, a first lens group having a positive refracting power and a second lens group having a negative refracting power. Each lens group is shifted in a direction perpendicular to the optical axis of the objective lens for stabilization of an image enlarged by each lens group. The rear conversion lens satisfies the following condition:

$|\Delta S_G/fR| < 0.1$ $1.1 < B < 1.8$

Here, fR is the focal length of the entire rear conversion lens, $\Delta S_G$ is the maximum shift amount of each lens group to be shifted in the direction perpendicular to the optical axis of the objective lens for stabilization of the image, and B is the magnification of the entire rear conversion lens.

DETAILED DESCRIPTION OF THE INVENTION

Figure 1:
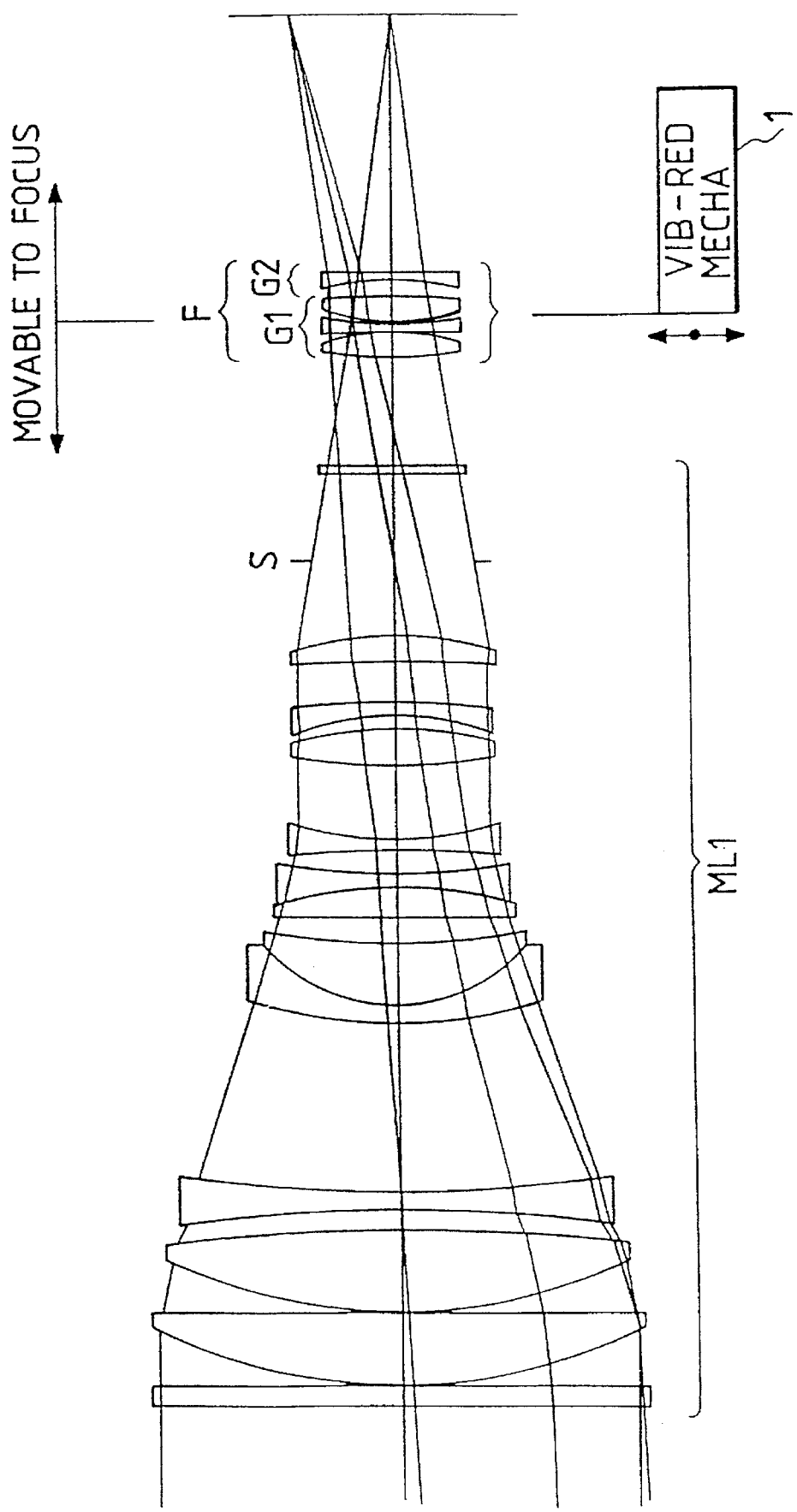
FIG. 1 shows the structure of a rear conversion lens according to a first embodiment of the present invention applied to a photographic telephoto lens (a first master lens)

First, the principle of the present invention will be described. In the present invention, for image stabilization, an entire rear conversion lens is shifted in the direction perpendicular to the optical axis of an objective lens with respect to which the rear conversion lens is mounted. In general, aberrations of rear conversion lenses are corrected preferably in themselves. Therefore, by shifting an entire rear conversion lens in the direction perpendicular to an optical axis of an objective lens with respect to which the conversion lens is mounted, an entire image is shifted in the direction perpendicular to the optical axis by a predetermined amount. Thereby, it is possible to correct the movement of the image condition caused by a shake of hands, vibration or the like. Within a range wherein changes of aberrations are not so large, the rear conversion lens may be shifted in the direction substantially perpendicular to the optical axis of the objective lens with respect to which the conversion lens is mounted.

However, if the above function were applied to a known rear conversion lens, a mechanism for shifting the entire rear conversion lens would become large and complicated in accordance with the entire largeness of the rear conversion lens. As a result, it would be unsuitable for practical use. Therefore, it is necessary to miniaturize the optical system of the rear conversion lens.

For the miniaturization, the structure of the optical system of the rear conversion lens is important. As the structure for the miniaturization, it is effective to dispose the positive lens group on the object side (objective lens: side) to converge light rays and to make diameters of lenses located on the image side from the positive lens group small.

Further, in the positive lens group, it is effective to make a lens closest to the objective lens be a positive lens.

Also, in general, rear conversion lenses have a negative refracting power as a whole. So, when a rear conversion lens is mounted with respect to an objective lens, spherical aberration tends to be left on the positive side (in a direction to separate from the lens in relation to a Gaussian plane as a reference). However, by the above-mentioned structure in which the positive lens group is disposed on the object side, the spherical aberration can be easily controlled toward the negative side (in a direction to approach the lens in relation to a Gaussian plane as a reference). As a result, it is possible to correct the spherical aberration to have optimum balance.

In the present invention, from the above viewpoint, the following conditions (1) and (2) are satisfied:

$$|\Delta S/fR|<0.1 \quad (1)$$

$$1.1<B<1.8 \quad (2)$$

Here, fR is the focal length of the entire rear conversion lens. ΔS is the maximum shift amount of the lens groups to be shifted integrally for the image stabilization in the direction perpendicular to the objective lens. B is the magnification of the entire rear conversion lens.

If the absolute value of the ratio in the condition (1) exceeds the upper limit, changes in aberrations are enlarged at the time of a vibration-reduction operation. Particularly, the difference between an optimum image surface in a meridional plane and that in a sagittal plane in the optical axis direction is enlarged in the peripheral area of an image surface. Also, astigmatism in the peripheral area of the image surface becomes considerable.

If the magnification in the condition (2) exceeds the upper limit, aberration correction becomes difficult and an optical system becomes complicated. As a result, the number of lenses is increased, so that the entire rear conversion lens becomes large.

If the magnification in the condition (2) is less than the lower limit, the rear conversion lens becomes unsuitable for practical use, and the shift amount of the image is too small as compared to the shift amount of the entire rear conversion lens in the direction perpendicular to the optical axis thereof.

Further, in the above structure of the present invention, the first lens group G1 has preferably the positive lens in the position closest to the objective lens and the following condition (3) is preferably satisfied:

$$0.2<|f1/fR|<5 \quad (3)$$

Here, f1 is the focal length of the first lens group G1 and fR is the focal length of the entire rear conversion lens.

The condition (3) defines the proper ratio of the focal length f1 of the first lens group G1 to the focal length fR of the entire rear conversion lens.

If the absolute value of the ratio in the condition (3) exceeds the upper limit, the spherical aberration tends to be large on the positive side and the Petzval sum is easily increased toward the negative side. As a result, preferable image forming characteristics cannot be obtained.

On the other hand, if it is less than the lower limit, the spherical aberration tends to be large on the negative side and the Petzval sum is easily increased toward the positive side. As a result, preferable image forming characteristics cannot be obtained.

If the upper and lower limits of the condition (3) are set to be 4 and 0.4 respectively, more preferable image forming characteristics can be obtained.

Also, the present invention preferably is provided with a mechanism for moving the whole or a portion of the rear conversion lens along the optical axis for focusing, and it is preferable to satisfy the following condition (4).

$$|\Delta Bf/fR|<0.1 \quad (4)$$

Here, ΔBf is the shift amount of a back focus between an infinity condition and a closest condition.

The condition (4) defines focusing ability of the rear conversion lens.

If the ratio of the condition (4) exceeds the upper limit, a large back focus is necessary in the infinity photographing condition. Therefore, such a rear conversion lens can only be mounted with respect to an objective lens having a long back focus and thus lacks flexibility. Also, the overall length of the rear conversion lens becomes long, so that miniaturization cannot be realized.

When the upper and lower limits of the condition (4) are set to be 0.95 and 0.04 respectively, more preferable image forming characteristics can be obtained.

In addition to the above conditions, it is preferable to satisfy the following conditions (5) and (6):

$$0.01<|D1/fR|<0.15 \quad (5)$$

$$0.2<|f2/f1|<2 \quad (6)$$

Here, f2 is the focal length of the second lens group G2 and D1 is an air gap on the optical axis between the first and second lens groups.

The condition (5) defines the spatial arrangement of the first and second lens groups G1 and G2 by the proper ratio of the air gap D1 to the focal length fR of the entire rear conversion lens.

If the absolute value of the ratio in the condition (5) exceeds the upper limit, the air gap D1 on the optical axis between the first and second lens groups G1 and G2 becomes long as compared to the thickness of the rear conversion lens on the optical axis, which is liable to cause under correction of the spherical aberration. Further, the pencil of rays over a principal ray produces a large aberration of positive outward coma. Also, astigmatic difference is enlarged and a meridional image surface is distorted largely in the positive direction.

On the other hand, if it is less than the lower limit, the air gap D1 on the optical axis between the first and second lens groups G1 and G2 becomes short as compared to the thickness of the rear conversion lens on the optical axis, which is liable to cause over correction of spherical aberration. Further, the pencil of rays over a principal ray produces a large aberration of negative inward coma. Also, astigmatic difference is enlarged and a meridional image surface is distorted largely in the negative direction. The correction of those aberrations is difficult.

If the upper and lower limits of the condition (5) are set to be 0.025 and 0.015 respectively, more preferable image forming characteristics can be obtained.

The condition (6) defines the focal length f2 of the second lens group G2 with respect to the focal length f1 of the first lens group G1 with a proper ratio.

If the absolute value of the ratio in the condition (6) exceeds the upper limit, distortion tends to be excessively large on the negative side and the Petzval sum is liable to increase toward the positive side. As a result, preferable image forming performance cannot be obtained.

On the other hand, if it is less than the lower limit, distortion tends to be excessively large on the positive side and the Petzval sum is liable to increase toward the negative side. As a result, preferable image forming performance cannot be obtained.

If the upper and lower limits of the condition (6) are set to be 0.8 and 0.2 respectively, more preferable image forming characteristics can be obtained.

In general, in objective lenses in which aberrations are preferably corrected, the Petzval sum has a positive value close to zero.

On the other hand, as a whole, rear conversion lenses are formed of a concave lens system having a negative refracting power and the Petzval sum usually has a negative value. In order to obtain preferable image forming performance when an objective lens and a rear conversion lens are combined, it is important to limit the Petzval sum of the combined whole system within a proper range close to zero. Therefore, it is necessary to take into consideration not only the distribution of refracting powers in the rear conversion lens but also the refractive indices of the lenses constituting the rear conversion lens.

Accordingly, in order to obtain more preferable image forming performance, in addition to the above conditions, it is preferable to satisfy the following condition:

$$1.82 < n_N \tag{7}$$

Here, $n_N$ is, among negative lenses of the rear conversion lens, the refractive index of the negative lens having a highest refractive index for d-line ($\lambda$=587.6 nm).

If $n_N$ in the condition (7) is less than the lower limit, the value of the Petzval sum of the whole system becomes large in the negative direction with respect to the master lens, whereby the correction of field curvature becomes difficult. As a result, preferable image forming performance cannot be obtained.

A positive lens element L1 of the first lens group G1 of the rear conversion lens which is disposed closest to the object is preferably a biconvex lens or a positive meniscus lens having a convex surface with a large curvature directed to the image side, and preferably satisfies the following condition (8):

$$-2 < q1 < -0.2 \tag{8}$$

Here, q1 is the shape factor of the positive lens element L1. The shape factor q1 is given by:

$$q1 = (r2 + r1)/(r2 - r1).$$

Here, r1 is the radius of curvature of the object-side surface and r2 is the radius of curvature of the image side surface.

When the shape factor in the condition (8) exceeds the upper limit, spherical aberration becomes over corrected and field curvature becomes large. Further, the pencil of rays over a principal ray tends to produce an aberration of positive outward coma. All the aberrations are difficult to be corrected.

On the other hand, if the shape factor is less than the lower limit, the spherical aberration becomes over corrected and field curvature becomes large toward the negative side. Further, the pencil of rays over a principal ray tends to produce an aberration of positive outward coma. All the aberrations are difficult to be corrected.

When the rear conversion lens is mounted with respect to an objective lens which is not so fast as to have F-number of about 3.5 or more, i.e., the relative aperture is so large, in addition to the above condition (8), the following condition (9) may be satisfied:

$$-3.0 < q1 < -1.0 \tag{9}$$

When satisfying the condition (9), the positive lens of the first lens group G1 of the rear conversion lens disposed closest to the object becomes a meniscus lens having a convex surface directed to the image side and a positive refracting power. By virtue of the invention, it is possible to obtain a rear conversion lens in which non-axial aberrations are small and especially the astigmatic difference is small.

When the magnification of the focal length of the objective lens is about 1.6 times, the number of lenses of the rear conversion lens is about five. However, when the magnification is about 1.3 times or less, the number thereof may be four or less.

Also, if an aspherical lens is utilized in the rear conversion lens, more preferable image forming performance and vibration-reduction performance can be attained.

In the present invention, a rear conversion lens having a vibration-reduction function is provided with a first lens group G1 having a positive refracting power and a second lens group G2 having a negative refracting power, in that order from an object side. The entire rear conversion lens of the present invention is shifted in the direction perpendicular to an optical axis for image stabilization and moved in the optical axis direction for focusing.

Preferred embodiments of the present invention will be described with reference to the accompanying drawings.

FIRST EMBODIMENT

FIG. 1 shows the structure of a rear conversion lens according to a first embodiment of the present invention applied to a photographic telephoto lens.

A first master lens ML1 consists of, in the following order from an object side, a filter, a positive meniscus lens having a convex surface directed to an object side, a biconvex lens, a biconcave lens, a cemented lens formed by cementing a negative meniscus lens having a convex surface directed to the object side and a positive meniscus lens having a convex surface directed to the object side, a cemented lens formed by cementing a plane-convex lens having a plane surface directed to the object side and a biconcave lens, a biconcave lens, a biconvex lens, a negative meniscus lens having a concave surface directed to the object side, a positive meniscus lens having a concave surface directed to the object side, an aperture diaphragm S, and a filter.

The rear conversion lens has, in the following order from the object side, a first lens group G1 consisting of a lens formed by a biconvex lens, a biconcave lens and a biconvex lens together and a second lens group consisting of a negative meniscus lens having a concave surface directed to the object side. The whole rear conversion lens is shifted properly by a vibration-reduction mechanism 1 in the direction perpendicular to the optical axis for image stabilization to correct a fluctuation of an image due to a shaking or a vibration of the lenses, and is simultaneously moved properly in the optical axis direction for focusing. As the vibration-reduction mechanism 1, it is possible to utilize a mechanism disclosed in commonly-assigned U.S. application Ser. No. 08/628,192 filed Apr. 5, 1996.

The following Table 1 shows values of the elements of the first embodiment. In the Table 1, f is a composite focal length in an infinity condition when the rear conversion lens is combined with the master lens, $F_{NO}$ is an F-number in the infinity condition, $2\omega$ is an angle of view in the infinity condition, and Bf is a back focus. Further, the left end figures indicate the order of the respective lens surfaces from the object side. r is the radius of curvature of each lens surface, d is a distance between each lens surface and the next surface, n is a refractive index of each lens for d-line ($\lambda$=587.6 nm) and $\beta$ is a magnification in a closest condition.

TABLE 1 f = 382.20
$F_{NO}$ = 3.76
$2\omega$ = 6.4°

|   | r | d | n |
|---|---|---|---|
| (First Master Lens) | | | |
| 1 | ∞ | 4.000 | 1.51680 |
| 2 | ∞ | 0.600 | |
| 3 | 117.215 | 14.400 | 1.49782 |
| 4 | 9900.139 | 0.300 | |
| 5 | 121.682 | 16.800 | 1.49782 |
| 6 | −409.936 | 4.100 | |
| 7 | −335.168 | 4.700 | 1.74950 |
| 8 | 478.702 | 34.720 | |
| 9 | 105.785 | 3.500 | 1.69680 |
| 10 | 35.547 | 14.400 | 1.59319 |
| 11 | 180.465 | 5.042 | |
| 12 | −13034.117 | 6.600 | 1.80384 |
| 13 | −80.574 | 2.300 | 1.58913 |
| 14 | 119.999 | 5.100 | |
| 15 | −174.189 | 2.300 | 1.67025 |
| 16 | 65.069 | 15.956 | |
| 17 | 147.298 | 7.600 | 1.49782 |
| 18 | −71.751 | 2.500 | |
| 19 | −54.416 | 2.300 | 1.80458 |
| 20 | −175.616 | 9.400 | |
| 21 | −269.771 | 5.400 | 1.74000 |
| 22 | −66.843 | 33.600 | |
| 23 | ∞ | 2.000 | 1.51680 |
| 24 | ∞ | (d24 = variable) | |
| (Rear Conversion Lens) | | | |
| 25 | 262.837 | 4.000 | 1.54814 |
| 26 | −86.751 | 0.200 | |
| 27 | −322.740 | 1.800 | 1.84042 |
| 28 | 42.500 | 0.300 | |
| 29 | 39.800 | 6.500 | 1.59507 |
| 30 | −163.763 | 3.000 | |
| 31 | −58.281 | 2.000 | 1.84042 |
| 32 | −235.166 | (Bf) | |

(Variable distances in focusing)

| | Infinity condition<br>f = 382.20 | Closest condition<br>$\beta$ = −0.02245 |
|---|---|---|
| d24 | 23.627 | 38.494 |
| Bf | 54.276 | 39.402 |

(Values corresponding to conditions)

| | | |
|---|---|---|
| f1 = | | 213.819 |
| f2 = | | −92.675 |
| fR = | | −171.253 |
| ΔS = | | 2 |
| ΔBf = | | 14.867 |
| D1 = | | 3 |
| (1) |ΔS/fR| | = | 0.00117 |
| (2) B | | 1.3 |

TABLE 1-continued f = 382.20
$F_{NO}$ = 3.76
$2\omega$ = 6.4°

| (3) |f1/fR| | = | 1.249 |
|---|---|---|
| (4) |ΔBf/fR| | = | 0.0868 |
| (5) |D1/fR| | = | 0.0175 |
| (6) |f2/f1| | = | 0.4334 |
| (7) n_ | = | 1.84042 |
| (8) q_ | = | −0.50256 |

(Data in vibration-reduction)

| | Infinity condition | Closest condition |
|---|---|---|
| Optical axis of the lens group Shift amount in the perpendicular direction (mm) | 2.00000 | 2.00000 |
| Move amount of the image (mm) | −0.60032 | −0.42665 |

SECOND EMBODIMENT

Figure 2:
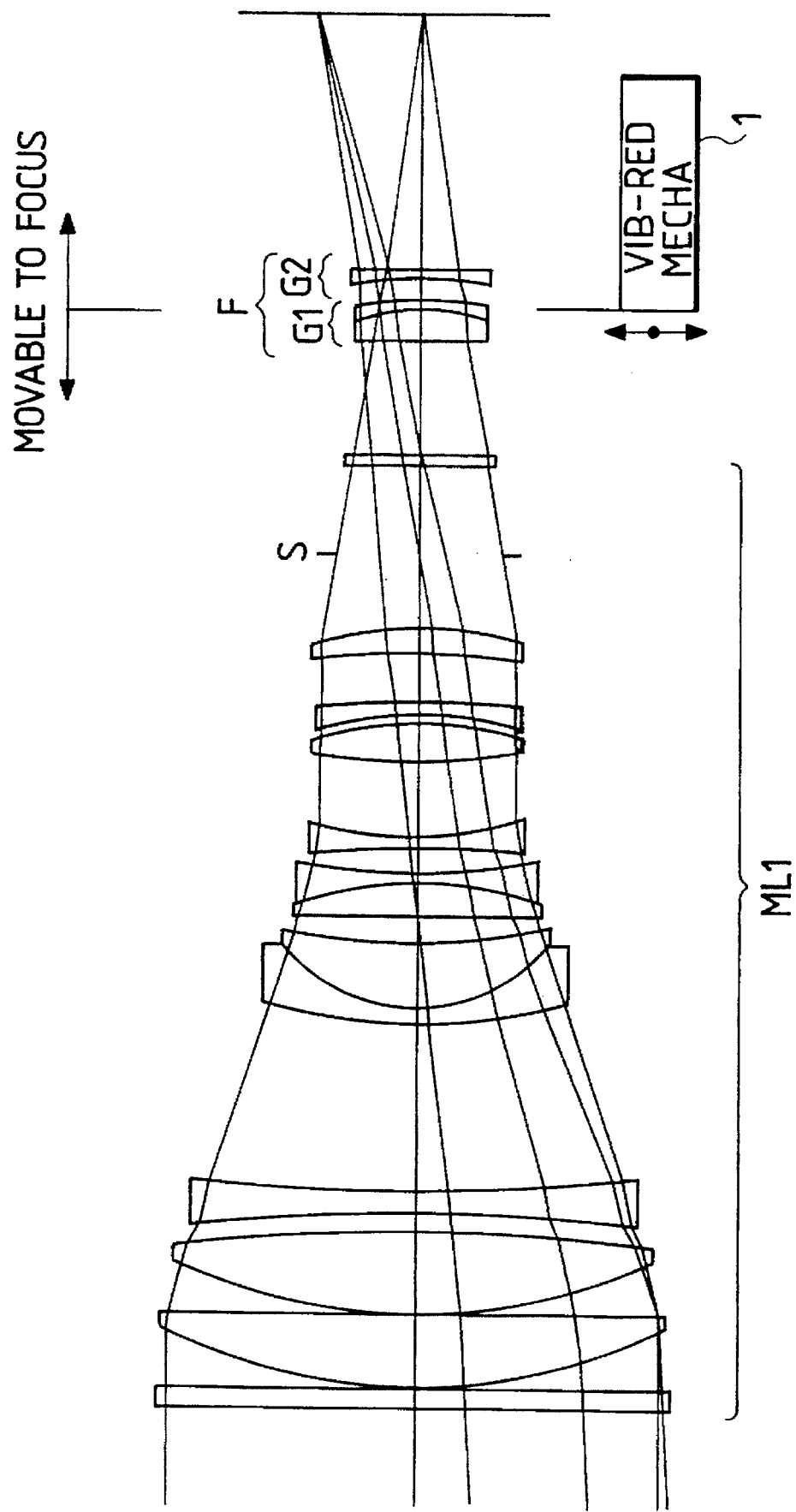
FIG. 2 shows the structure of a rear conversion lens according to a second embodiment of the present invention applied to a photographic telephoto lens (a first master lens)

FIG. 2 shows the structure of a rear conversion lens according to a second embodiment of the present invention applied to a photographic telephoto lens (first master) lens).

The first master lens ML1 is the same as in the first embodiment.

The rear conversion lens has, in the following order from the object side, a first lens group G1 consisting of a cemented lens formed by cementing a biconvex lens and a negative meniscus lens having a concave surface directed to the object side, and a second lens group G2 consisting of a biconcave lens. The whole rear conversion lens is shifted properly by a vibration-reduction mechanism 1 in the direction perpendicular to the optical axis for image stabilization to correct a fluctuation of an image due to a shaking or a vibration of the lenses, and is simultaneously moved properly in the optical axis direction for focusing. The same mechanism as mentioned in the first embodiment is utilized as the vibration-reduction mechanism 1.

Although the rear conversion lens of this embodiment has the same fundamental structure as that in the first embodiment, the refracting powers and shapes of the respective lens groups are different from those in the first embodiment.

The following Table 2 shows values of the elements of the second embodiment. In the Table 2, f is a composite focal length in an infinity condition, $F_{NO}$ is an F-number in the infinity condition, $2\omega$ is an angle of view in the infinity condition, and Bf is a back focus. Further, the left end figures indicate the order of the respective lens surfaces from the object side. r is the radius of curvature of each lens surface, d is a distance between each lens surface and the next surface, n is a refractive index of each lens for d-line ($\lambda$=587.6 nm) and p is a magnification in a closest condition.

TABLE 2 f = 352.80
$F_{NO}$ = 3.47
$2\omega$ = 6.92°

| r | d | n |
|---|---|---|

TABLE 2-continued f = 352.80
F$_{NO}$ = 3.47
2ω = 6.92°

(First Master Lens)

| | | | |
|---|---|---|---|
| 1 | ∞ | 4.000 | 1.51680 |
| 2 | ∞ | 0.600 | |
| 3 | 117.215 | 14.400 | 1.49782 |
| 4 | 9900.139 | 0.300 | |
| 5 | 121.682 | 16.800 | 1.49782 |
| 6 | −409.936 | 4.100 | |
| 7 | −335.168 | 4.700 | 1.74950 |
| 8 | 478.702 | 34.720 | |
| 9 | 105.785 | 3.500 | 1.69680 |
| 10 | 35.547 | 14.400 | 1.59319 |
| 11 | 180.465 | 5.042 | |
| 12 | −13034.117 | 6.600 | 1.80384 |
| 13 | −80.574 | 2.300 | 1.58913 |
| 14 | 119.999 | 5.100 | |
| 15 | −174.189 | 2.300 | 1.67025 |
| 16 | 65.069 | 15.956 | |
| 17 | 147.298 | 7.600 | 1.49782 |
| 18 | −71.751 | 2.500 | |
| 19 | −54.416 | 2.300 | 1.80458 |
| 20 | −175.616 | 9.400 | |
| 21 | −269.771 | 5.400 | 1.74000 |
| 22 | −66.843 | 33.600 | |
| 23 | ∞ | 2.000 | 1.51680 |
| 24 | ∞ | (d24 = variable) | |

(Rear Conversion Lens)

| | | | |
|---|---|---|---|
| 25 | 11292.241 | 6.700 | 1.61293 |
| 26 | −40.000 | 1.800 | 1.84042 |
| 27 | −60.918 | 4.000 | |
| 28 | −73.775 | 2.000 | 1.84042 |
| 29 | 563.228 | (Bf) | |

(Variable distances in focusing)

| | Infinity condition<br>f = 352.80 | Closest condition<br>β = −0.00645 |
|---|---|---|
| d24 | 23.588 | 35.992 |
| Bf | 52.290 | 39.886 |

(Values corresponding to conditions)

| | | |
|---|---|---|
| f1 = | | 121.402 |
| f2 = | | −77.506 |
| fR = | | −232.835 |
| ΔS = | | 2 |
| ΔBf = | | 12.404 |
| D1 = | | 4 |
| (1) |ΔS/FR| | = | 0.00859 |
| (2) B | = | 1.2 |
| (3) |f1/fR| | = | 0.5214 |
| (4) |ΔBf/lfR| | = | 0.0533 |
| (5) D1/lfR| | = | 0.0172 |
| (6) |f2/f1| | = | 0.638 |
| (7) n_ | = | 1.84042 |
| (8) q_ | = | −0.99294 |

(Data in vibration-reduction)

| | Infinity condition | Closest condition |
|---|---|---|
| Optical axis of the lens group Shift amount in the perpendicular direction (mm) | 2.00000 | 2.00000 |
| Move amount of the image (mm) | −0.40020 | −0.29361 |

THIRD EMBODIMENT

Figure 3:
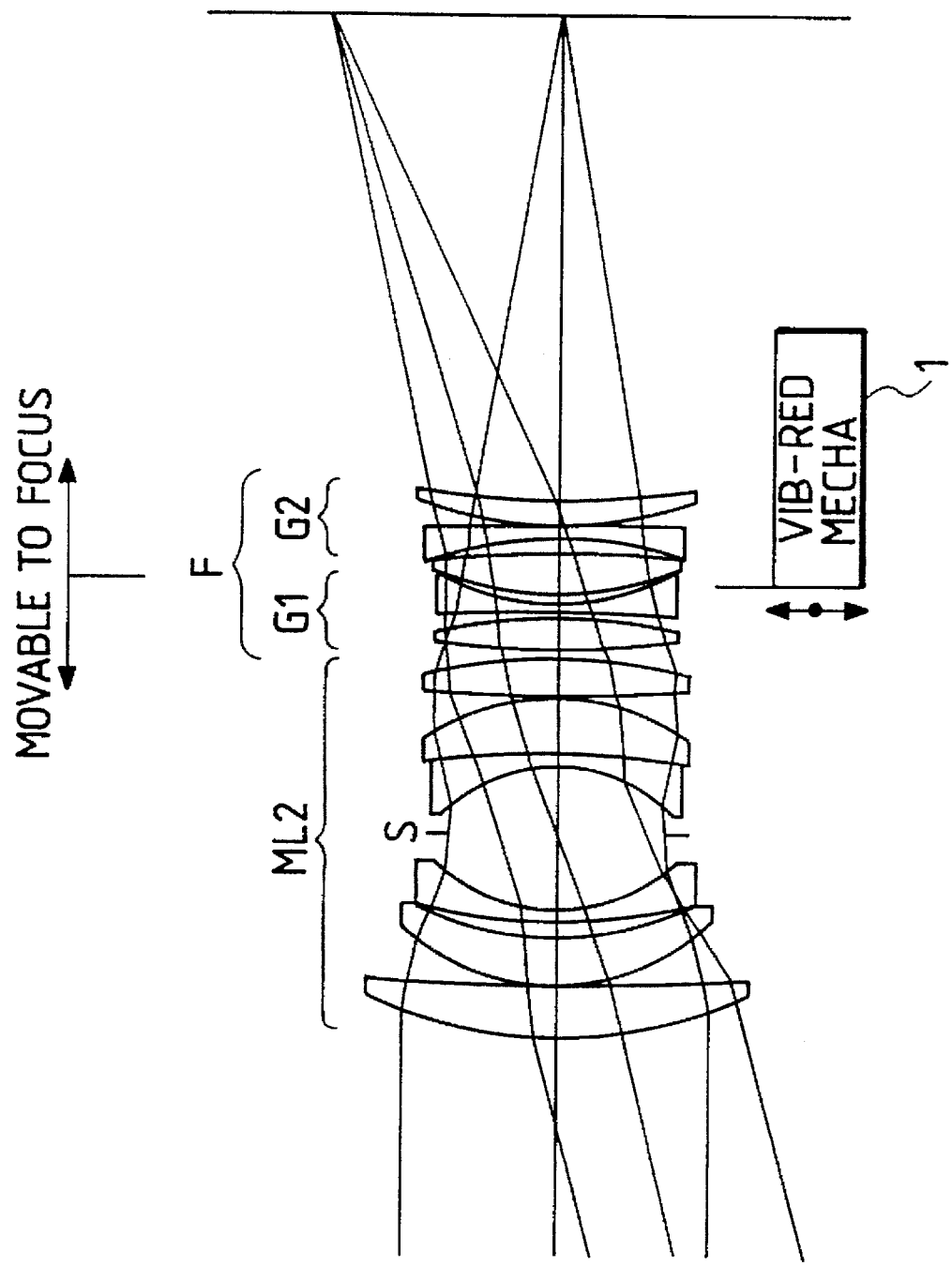
FIG. 3 shows the structure of a rear conversion lens according to a third embodiment of the present invention applied to a photographic standard lens (a second master lens).

FIG. 3 shows the structure of a rear conversion lens according to a third embodiment of the present invention applied to a photographic standard lens (second master lens).

A second master lens ML2 consists of, in the following order from an object side, a positive meniscus lens having a convex surface directed to the object side, a positive meniscus lens having a convex surface directed to the object side, a negative meniscus lens having a convex surface directed to the object side, an aperture diaphragm S, a cemented lens formed by cementing a negative meniscus lens having a concave surface directed to the object side and a positive meniscus lens having a concave surface directed to the object side, and a biconvex lens.

The rear conversion lens has, in the following order from the object side, a first lens group G1 consisting of a biconvex lens, a biconcave lens and a biconvex lens, and a second lens group G2 consisting of a negative meniscus lens having a concave surface directed to the object side and a positive meniscus lens having a convex surface directed to the object side. The whole rear conversion lens is shifted properly by a vibration-reduction mechanism 1 in the direction perpendicular to the optical axis for image stabilization to correct a fluctuation of an image due to a shaking or a vibration of the lenses, and is simultaneously moved properly in the optical axis direction for focusing. The same mechanism as mentioned in the first embodiment is utilized as the vibration-reduction mechanism 1.

Although the rear conversion lens of this embodiment has the same fundamental structure as that in the first embodiment, the refracting powers and shapes of the respective lens groups are different from those in the first embodiment.

The following Table 3 shows values of the elements of the third embodiment. In the Table 3, f is a focal length in an infinity condition, F$_{NO}$ is an F-number in the infinity condition, 2ω is an angle of view in the infinity condition, and Bf is a back focus. Further, the left end figures indicate the order of the respective lens surfaces from the object side. r is the radius of curvature of each lens surface, d is a distance between each lens surface and the next surface, n is a refractive index of each lens for d-line (λ=587.6 nm) and β is a magnification in a closest condition.

TABLE 3 f = 82.56
F$_{NO}$ = 2.87
2ω = 29.32°

| | r | d | n |
|---|---|---|---|
| (Second Master Lens) | | | |
| 1 | 41.000 | 4.600 | 1.79631 |
| 2 | 197.900 | 0.100 | |
| 3 | 21.400 | 4.700 | 1.78797 |
| 4 | 32.600 | 1.000 | |
| 5 | 51.000 | 1.100 | 1.74000 |
| 6 | 16.200 | 13.100 | |
| 7 | −16.500 | 1.300 | 1.74000 |
| 8 | −100.000 | 5.400 | 1.74443 |
| 9 | −20.640 | 0.100 | |
| 10 | 204.300 | 3.450 | 1.79631 |
| 11 | −49.652 | (d11 = variable) | |
| (Rear Conversion Lens) | | | |
| 12 | 133.224 | 2.500 | 1.59507 |
| 13 | −51.185 | 0.500 | |
| 14 | −190.941 | 1.000 | 1.84042 |

TABLE 3-continued $f = 82.56$
$F_{NO} = 2.87$
$2\omega = 29.32°$

| 15 | 24.050 | 0.500 | |
| 16 | 27.742 | 4.000 | 1.59507 |
| 17 | −109.987 | 1.500 | |
| 18 | −31.500 | 1.000 | 1.84042 |
| 19 | 2854.300 | 0.100 | |
| 20 | 37.807 | 2.500 | 1.53172 |
| 21 | 111.841 | (Bf) | |

(Variable distances in focusing)

| | Infinity condition<br>f = 82.56 | Closest condition<br>β = −0.08282 |
|---|---|---|
| d11 | 1.000 | 5.682 |
| Bf | 44.015 | 39.333 |

(Values corresponding to conditions)

| f1 = | 244.849 |
| f2 = | −56.795 |
| fR = | −75.263 |
| ΔS = | 1 |
| ΔBf= | 4.682 |
| D1 = | 1.5 |
| (1) \|ΔS/fR\| = | 0.0133 |
| (2) B = | 1.6 |
| (3) \|f1/fR\| = | 3.253 |
| (4) ΔBf/\|fR\| = | 0.0622 |
| (5) D1/\|fR\| = | 0.0199 |
| (6) \|f2/f1\| = | 0.232 |
| (7) n_ = | 1.84042 |
| (8) q_ = | −0.44488 |

(Data in vibration-reduction)

| | Infinity condition | Closest condition |
|---|---|---|
| Optical axis of the lens group Shift amount in the perpendicular direction (mm) | 1.00000 | 1.00000 |
| Move amount of the image (mm) | −0.60020 | −0.53796 |

Thus, the rear conversion lenses of the above embodiments can maintain excellent image forming performance even though mounted with respect to fast objective lenses having F-numbers of 1.8 to 2.9. The F-number of the whole system is a value obtained by multiplying the F-number of the master lens by the magnification of the rear conversion lens and there is no loss of luminous flux in the state with the diaphragm opened.

According to the above embodiments, it is possible to provide smaller rear conversion lenses capable of performing image stabilization and focusing with high performance. Also, if a focus detecting function is combined, autofocusing is possible.

The present invention is not limited to the above embodiments but various structures can be adopted without departing from the scope of the invention.

What is claimed is:

1. A rear conversion lens having a negative refracting power and a function for magnifying, when mounted on an image side of an objective lens, an image formed by said objective lens, comprising, in the following order from an objective lens side, a first lens group having a positive refracting power and a second lens group having a negative refractive power, wherein said lens groups are shifted as a whole in a direction/perpendicular to an optical axis of said objective lens to stabilize said image magnified by said lens groups and said rear conversion lens satisfies:

$$|\Delta S/fR|<0.1$$

$$1.1<B<1.8,$$

wherein fR: a focal length of said rear conversion lens

ΔS: a maximum shift amount of said lens groups shifted as a whole in the direction perpendicular to said optical axis of said objective lens for stabilization of said image B: a magnification of said rear conversion lens.

2. A rear conversion lens according to claim 1, wherein said first lens group comprises a positive lens in a position closest to said objective lens and said rear conversion lens satisfies:

$$0.2<|f1/fR|<5,$$

wherein f1: a focal length of said first lens group.

3. A rear conversion lens according to claim 2, wherein said rear conversion lens satisfies:

$$0.01<|D1/fR|<0.15$$

$$0.2<|f2/f1|<2,$$

wherein f2: a focal length of said second lens group;

D1: an air gap on an optical axis of said rear conversion lens between said first and second lens groups.

4. A rear conversion lens according to claim 3, which includes negative lenses, and which satisfies the following condition:

$$1.82<n_N,$$

wherein $n_N$: a refractive index of one of said negative lenses having a highest refractive index for d-line.

5. A rear conversion lens according to claim 4, wherein said first lens group comprises a positive lens in a position closest to said objective lens and said positive lens satisfies:

$$-2<q1<-0.2$$

$$q1=(r2+r1)/(r2-r1),$$

wherein q1: a shape factor of said positive lens;

r1: a radius of curvature of an object-side surface of said positive lens;

r2: a radius of curvature of an image-side surface of said positive lens.

6. A rear conversion lens according to claim 1, wherein said lens groups are moved in the optical axis direction for focusing.

7. A rear conversion lens according to claim 6, wherein said rear conversion lens satisfies:

$|\Delta Bf/fR|<0.1$, wherein

ΔBf: a move amount of a back focus between an infinity condition and a closest condition.

8. A rear conversion lens according to claim 1, wherein said rear conversion lens satisfies:

$0.01<|D1/fR|<0.15$, $0.2<|f2/f1|<2$, wherein f1: a focal length of said first lens group f2: a focal length of said second lens group D1: an air gap on an optical axis of said rear conversion lens between said first and second lens groups.

9. A rear conversion lens according to claim 1, which includes negative lenses, and which satisfies the following condition:

$1.82<n_N$, wherein $n_N$: a refractive index of one of said negative lenses having a highest refractive index for d-line.

10. A rear conversion lens according to claim 1, wherein said first lens group comprises a positive lens in a position closest to said objective lens and said positive lens satisfies:

$-2<q1<-0.2$ $q1=(r2+r1)/(r2-r1)$, wherein q1: a shape factor of said positive lens;

r1: a radius of curvature of an object-side surface of said positive lens;

r2: a radius of curvature of an image-side surface of said positive lens.

11. A rear conversion lens according to claim 1, wherein said first lens group has, in the following order from an object side, a biconvex lens, a biconcave lens and a biconvex lens and said second lens group has a negative meniscus lens having a concave surface directed to said objective lens.

12. A rear conversion lens according to claim 1, wherein said first lens group has a cemented lens formed by cementing, in the following order from an object side, a biconvex lens and a negative meniscus lens together and said second liens group has a biconcave lens.

13. A rear conversion lens according to claim 1, wherein said first lens group has, in the following order from an object side, a biconvex lens, a biconcave lens and a biconvex lens and said second lens group has, in the following order from an object side, a biconcave lens, a positive meniscus lens having a convex surface directed to said objective lens.

14. A rear conversion lens having a negative refracting power and a function for magnifying, when mounted on an image side of an objective lens, an image formed by said objective lens, comprising, in the following order from an objective lens side, a first lens group having a positive refracting power and a second lens group having a negative refracting power, wherein each lens group is moved in a direction perpendicular to an optical axis of said objective lens to stabilize said image magnified by each lens group and said rear conversion lens satisfies:

$|\Delta S_G/fR|<0.1$ $1.1<B<1.8$, wherein fR: a focal length of said rear conversion lens $\Delta S_G$: a maximum shift amount of each lens groups shifted in the direction perpendicular to said optical axis of said objective lens for stabilization of said image B: a magnification of said rear conversion lens.

15. A rear conversion lens having a negative refracting power and a function for magnifying, when mounted on an image side of an objective lens, an image formed by said objective lens, comprising lens groups, wherein each lens group is shifted in a direction perpendicular to an optical axis of said objective lens to stabilize said image magnified by each lens group and said rear conversion lens satisfies:

$|\Delta S_G/fR|<0.1$ $1.1<B<1.8$, wherein fR: a focal length of said rear conversion lens $\Delta S_G$: a maximum shift amount of each lens group shifted in the direction perpendicular to said optical axis of said objective lens for stabilization of said image B: a magnification of said rear conversion lens.

* * * * *